United States Patent
Yoshida et al.

(10) Patent No.: US 7,345,384 B2
(45) Date of Patent: Mar. 18, 2008

(54) LINEAR MOTOR ARMATURE AND LINEAR MOTOR

(75) Inventors: Shusaku Yoshida, Fukuoka (JP); Akio Sakai, Fukuoka (JP); Yuji Nitta, Fukuoka (JP); Takao Fujii, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 336 days.

(21) Appl. No.: 10/496,985

(22) PCT Filed: Nov. 29, 2002

(86) PCT No.: PCT/JP02/12570

§ 371 (c)(1),
(2), (4) Date: May 27, 2004

(87) PCT Pub. No.: WO03/047075

PCT Pub. Date: Jun. 5, 2003

(65) Prior Publication Data

US 2004/0262999 A1  Dec. 30, 2004

(30) Foreign Application Priority Data

Nov. 30, 2001 (JP) .................. 2001-367067

(51) Int. Cl.
*H02K 41/00* (2006.01)
(52) U.S. Cl. .................. 310/12; 310/16
(58) Field of Classification Search .......... 310/11–14, 310/16, 52–64
See application file for complete search history.

(56) References Cited

U.S. PATENT DOCUMENTS

| 5,998,889 | A | * | 12/1999 | Novak | 310/12 |
| 6,657,332 | B2 | * | 12/2003 | Balas | 310/58 |
| 2002/0084702 | A1 | * | 7/2002 | Balas | 310/58 |

FOREIGN PATENT DOCUMENTS

| JP | 6-41381 U | 5/1994 |
| JP | 6-62787 U | 9/1994 |
| JP | 6-70484 U | 9/1994 |
| JP | 2001-25227 A | 1/2001 |
| JP | 2001-218443 A | 8/2001 |
| JP | 2001-275334 A | 10/2001 |

* cited by examiner

Primary Examiner—Dang Le
(74) Attorney, Agent, or Firm—Sughrue Mion, PLLC (57) ABSTRACT

In a linear motor, a can has a two-layer structure including an inner can 2 and an outer can 3, and an inner passage 7 formed between an armature winding 9 and the inner can 2 and an outer passage 8 formed between the inner can 2 and the outer can 3 are constituted by each can. Communicating portions 7A and 8A for causing the inner passage 7 and the outer passage 8 to communicate with each other are provided in the vicinity of a refrigerant supply port 5 in each of the cans 2 and 3 in such a manner that a refrigerant supplied from the refrigerant supply port 5 branches into the inner passage 7 and the outer passage 8 and thus flows. Consequently, it is possible to obtain a linear motor armature and a linear motor having a high cooling capability which can prevent the deformation of the can by using a conventional inactive refrigerant to improve the passage for the refrigerant.

8 Claims, 7 Drawing Sheets

LINEAR MOTOR ARMATURE AND LINEAR MOTOR

TECHNICAL FIELD

The present invention relates to a linear motor armature and a linear motor which can relieve the deformation of a can.

BACKGROUND ART

In a projection exposing apparatus (a stepper) to be used in a photolithographic process for manufacturing a semiconductor device, a liquid crystal display or the like, a shape measuring apparatus for measuring a thing to be processed such as a wafer or an apparatus requiring precision positioning such as a high precision processing machine, generation of heat from a linear motor as a driving source might adversely influence performance of the apparatus.

In more detail, a support member of an armature winding and a surrounding structure, and atmosphere are heated so that temperature is raised by the heat generated from the armature winding of the linear motor, and precision in the positioning of an XY stage to be driven by the linear motor is remarkably deteriorated. In order to prevent the temperature of the armature winding of the linear motor from being changed, a linear motor comprising a cooling mechanism for forcibly cooling an armature winding has been disclosed in JP-UM-A-6-041381 and JP-UM-A-6-70484 which have been filed by the present applicant, for example.

Figure 7:
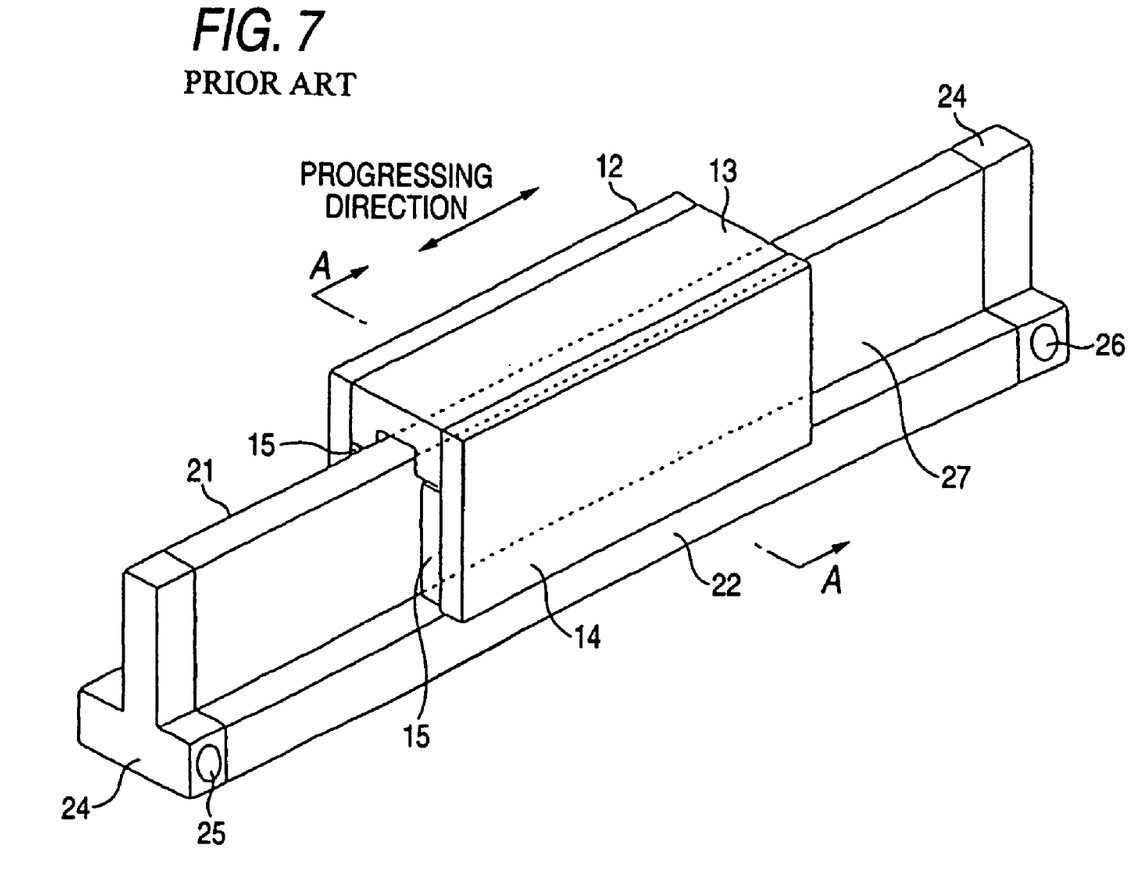
FIG. 7 is a general perspective view showing a linear motor according to an example of the conventional art.

FIG. 7 is a general perspective view showing a linear motor according to an example of the conventional art, illustrating an example of a moving-magnet type linear motor in which a field side is set to be a moving member and an armature side is set to be a stator.

In FIG. 7, 12 denotes a moving member, 13 denotes a moving base, 14 denotes a yoke, 15 denotes a permanent magnet, 21 denotes a stator, 22 denotes a stator base, 24 denotes a header, 25 denotes a refrigerant supply port, 26 denotes a refrigerant discharge port and 27 denotes a can. The stator 21 is constituted by the stator base 22, the header 24, the can 27 and an armature winding (not shown). The header 24 provided on both ends of the can 27 has the refrigerant supply port 25 for supplying a refrigerant to one of the both ends of the can 27 and has the refrigerant discharge port 26 for discharging the refrigerant on the other end. Moreover, the moving member 12 is constituted by the moving member base 13, the yoke 14 and the permanent magnet 15. The moving member 12 is supported to maintain a constant clearance with respect to the stator 21 by means of a linear guide which is not shown, or the like.

Next, the stator 21 will be described in detail.

Figure 8:
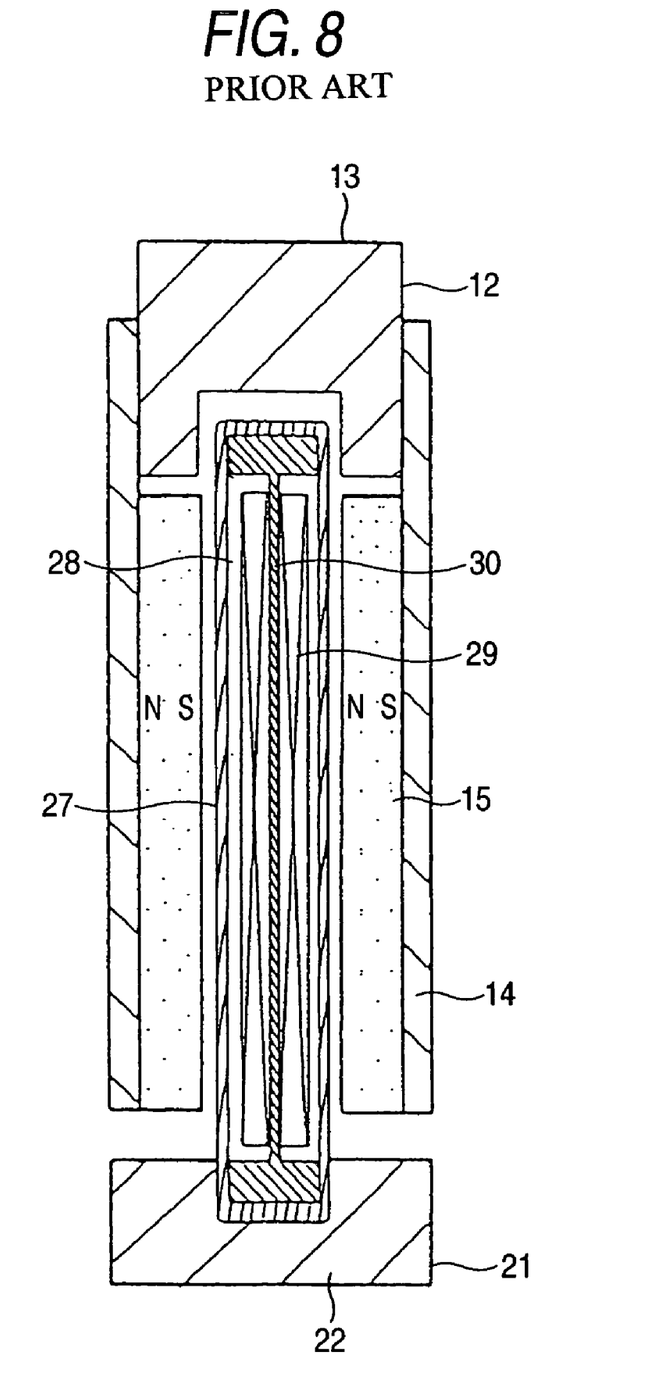
FIG. 8 is a front sectional view taken along an A-A line in FIG. 7.

FIG. 8 is a front sectional view taken along an A-A line in FIG. 7.

In FIG. 8, 28 denotes a passage, 29 denotes an armature winding and 30 denotes a winding fixing frame.

The stator 21 is made to have wholly inverse T-shape and the can 27 is supported upward in the dent of the stator base 22. The winding fixing frame 30 is provided in a space formed by a header sealing the can 27, the can 27 and a header (not shown), and furthermore, the armature winding 29 is fixed in the longitudinal direction of the winding fixing frame 30. There is provided the passage 28 for causing a refrigerant to pass through the inside of the can 27. The can 27 is provided in a magnetic field. Therefore, a non-magnetic material, for example, stainless, resin or ceramics is used.

With such a structure, a predetermined current is applied to the armature winding 29 to act on a magnetic field created by the permanent magnet 15, thereby generating a thrust on the moving member 12. As shown in FIG. 7, the moving member 12 can be moved in the direction of progress shown in an arrow.

Then, the refrigerant is supplied from the refrigerant supply port 25 provided on the stator 21 and is injected from the refrigerant discharge port 26, and thus flows in the passage 28 formed by the armature winding 29 and the can 27, thereby recovering the heat, which is generated from the armature winding 29 due to a copper loss, so as to alleviate a temperature increase at the surface of a motor.

In the conventional art, a high heat absorbing efficiency is required for the refrigerant in order to cause the flow of the refrigerant to be constant, thereby enhancing the cooling capability of the armature winding 29. However, it is desirable that the refrigerant should be chemically inactive in order to maintain the insulating characteristic of the armature winding 29. However, the inactive refrigerant generally has a poor heat absorbing efficiency.

Moreover, it is also possible to enhance the cooling capability by increasing the flow of the refrigerant. However, since the can is deformed under the pressure of the refrigerant, the refrigerant has a poor heat absorbing efficiency in its inactive state, and restrictions made by apparatus itself, there is eventually a certain limitation.

The invention has been made to solve the problems and has an object to provide a linear motor armature and a linear motor which can prevent the deformation of a can and can greatly reduce a rise in the temperature of the linear motor by improving a refrigerant passage using a conventional inactive refrigerant, and has a high cooing capability.

DISCLOSURE OF THE INVENTION

In order to solve the problems, a first aspect of the invention is directed to a linear motor armature comprising an armature winding and a can provided to cover the armature winding and serving to cause a refrigerant to flow around the armature winding to carry out cooling, wherein the can is constituted by a two-layer structure having an inner can and an outer can and includes an inner passage formed between the armature winding and the inner can and an outer passage formed between the inner can and the outer can, both ends of the can have a header provided in such a manner that one of the ends serves as a refrigerant supply port and the other end serves as a refrigerant discharge port, and a communicating portion for causing the inner passage and the outer passage to communicate with each other is provided in the vicinity of the refrigerant supply port of the can in such a manner that the refrigerant supplied from the refrigerant supply port branches into the inner passage and the outer passage and thus flows.

Moreover, a second aspect of the invention is directed to a linear motor armature comprising an armature winding and a can provided to cover the armature winding and serving to cause a refrigerant to flow around the armature winding to carry out cooling, wherein the can is constituted by a two-layer structure having an inner can and an outer can and includes an inner passage formed between the armature winding and the inner can and an outer passage formed between the inner can and the outer can, one of ends of the can is provided with a head having at least a refrigerant supply port and a refrigerant discharge port, and the inner can is provided with a communicating portion for causing the outer passage and the inner passage to communicate with each other at the other end on an opposite side to a side on which the refrigerant supply port is provided in such a manner that the refrigerant supplied from the refrigerant supply port is turned back to the inner passage through the outer passage and thus flows.

A third aspect of the invention is directed to the linear motor armature according to the first aspect of the invention, wherein the refrigerant injection port of the header includes an inner injection piping provided to be connected to the refrigerant injection port for the inner passage and an outer injection piping provided to cover an outside of the inner injection piping and disposed to be connected to the refrigerant injection port for the outer passage, and the refrigerant is injected in the two-layer states.

Furthermore, a fourth aspect of the invention is directed to the linear motor armature according to the first, second or third aspect of the invention, wherein the outer can and the inner can are formed to be rectangularly cylindrical.

Moreover, a fifth aspect of the invention is directed to the linear motor armature according to the first, second or third aspect of the invention, wherein the outer can and the inner can are formed to be cylindrical.

Furthermore, a sixth aspect of the invention is directed to a linear motor comprising the linear motor armature according to any of the first to fifth aspects of the invention, and a field portion opposed to the armature through a void, the field portion being constituted by a yoke and a plurality of permanent magnets which are provided on the yoke adjacently to each other in such a manner that polarities are alternately different from each other, and one of the armature and the field portion being set to be a moving member which relatively moves and the other being set to be a stator.

Figure 1:
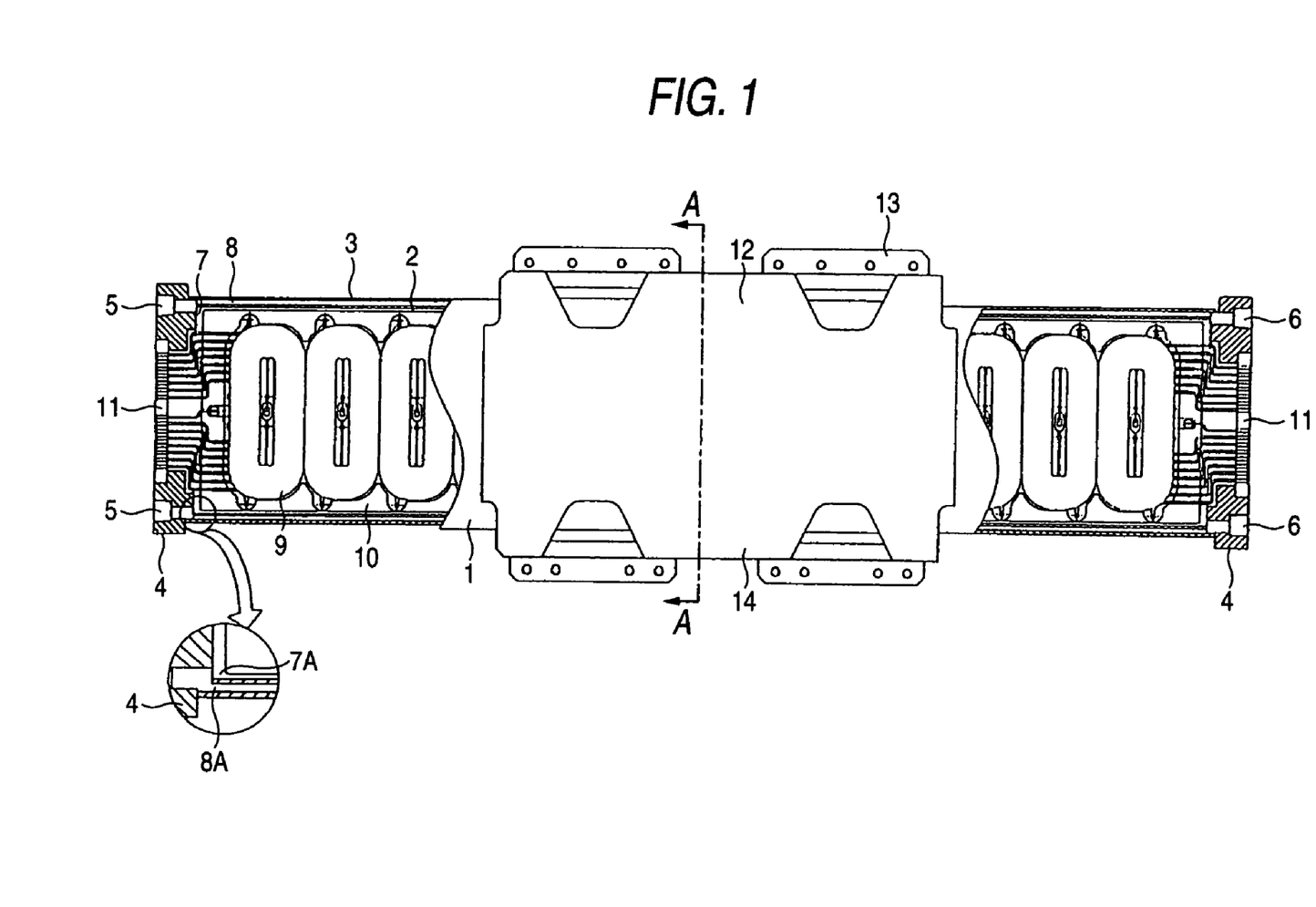
FIG. 1 is a partially sectional side view showing a linear motor in which an armature winding is provided on a stator according to a first example of the invention.

The reference numerals shown in FIG. 1 are as follows. 1 denotes a stator, 2 denotes an inner can, 3 denotes an outer can, 4 denotes a header, 5 denotes a refrigerant supply port, 6 denotes a refrigerant injection port, 7 denotes an inner passage, 7A and 8A denote a communicating portion, 8 denotes an outer passage, 9 denotes an armature winding, 10 denotes a winding fixing frame, 11 denotes a terminal base, 12 denotes a moving member, 13 denotes a moving member base, and 14 denotes a yoke.

BEST MODE FOR CARRYING OUT THE INVENTION

Examples of the invention will be described with reference to the drawings.

FIRST EXAMPLE

Figure 2:
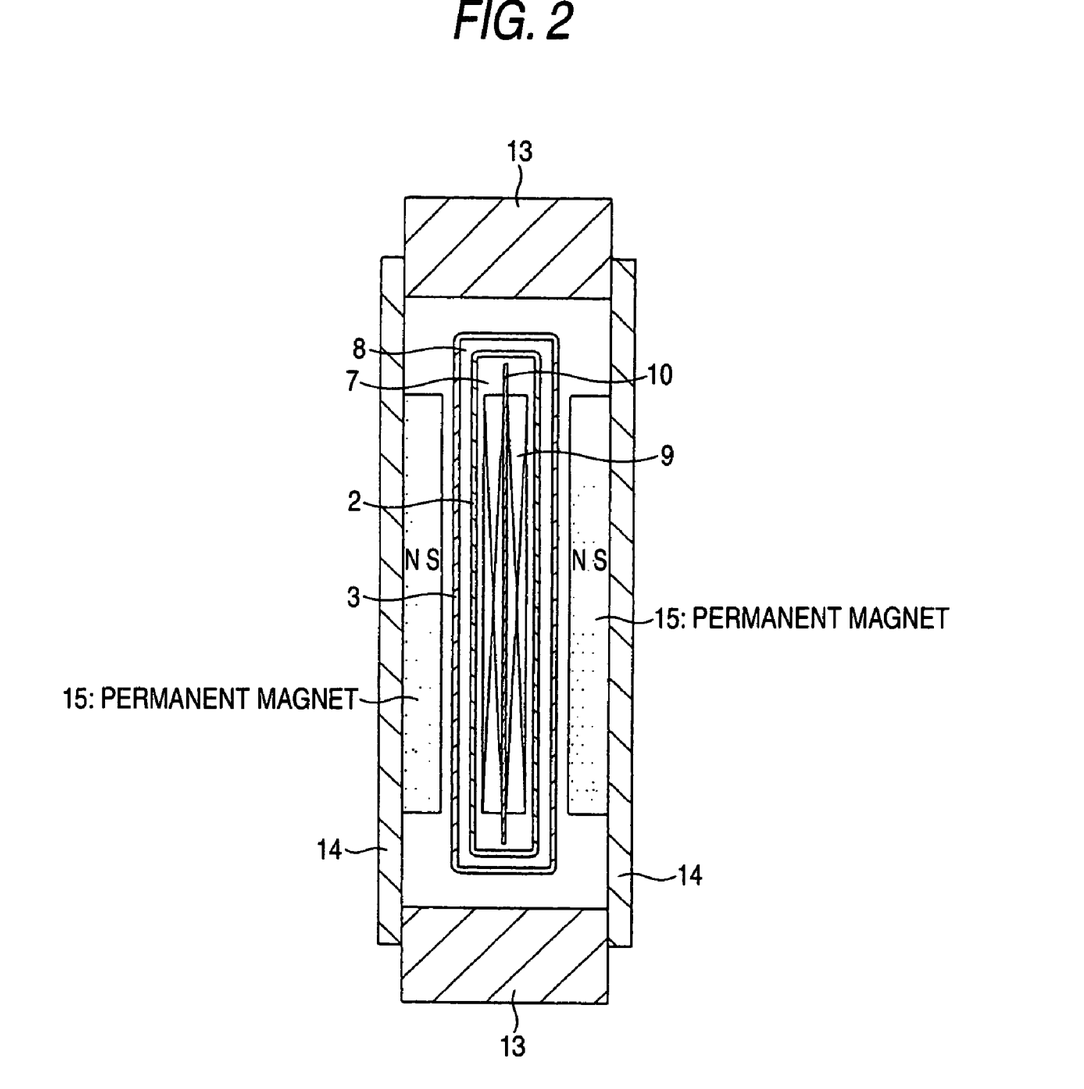
FIG. 2 is a front sectional view taken along an A-A line of the linear motor in FIG. 1.

FIG. 1 is a partially sectional side view showing a linear motor in which an armature winding is provided on a stator according to a first example of the invention and FIG. 2 is a sectional view taken along an A-A line in FIG. 1.

In FIGS. 1 and 2, 1 denotes a stator, 2 denotes an inner can, 3 denotes an outer can, 4 denotes a header, 5 denotes a refrigerant supply port, 6 denotes a refrigerant injection port, 7 denotes an inner passage, 8 denotes an outer passage, 9 denotes an armature winding, 10 denotes a winding fixing frame, 11 denotes a terminal base, 12 denotes a moving member, 13 denotes a moving member base, 14 denotes a yoke, and 15 denotes a permanent magnet. The invention is the same as the conventional art in that a plurality of armature windings 9 is provided in the longitudinal direction of the winding fixing frame 10, and the moving member 12 is constituted by the yoke 14 and the permanent magnet 15 and is supported by a linear guide or the like which is not shown.

The invention is different from the conventional art as follows.

More specifically, in place of the can according to the conventional art shown in FIG. 8, the can has a two-layer structure constituted by the inner can 2 and the outer can 3, and furthermore, the outer can 2 and the inner can 3 are formed like a rectangular cylinder as shown in FIG. 2. The outer can 2 and the inner can 3 include the inner passage 7 formed between the armature winding 9 and the inner can 2 and the outer passage 8 formed between the inner can 2 and the outer can 3. Each of the cans 2 and 3 is sealed and fastened by welding, a sealing agent or the like in such a manner that a refrigerant does not leak out.

As shown in FIG. 1, communicating portions 7A and 8A to cause the inner passage 7 and the outer passage 8 to communicate with each other are provided in the vicinity of the refrigerant supply port 5 in each of the cans 2 and 3 in such a manner that the refrigerant supplied from the refrigerant supply port 5 branches into the inner passage 7 and the outer passage 8 and thus flows.

Next, description will be given to the operation of the cooling mechanism of the linear motor.

After the refrigerant supplied from the refrigerant supply port 5 flows into the communicating portions 7A and 8A, it is caused to branch into the inner passage 7 and the outer passage 8 respectively and flows over almost the whole length of the stator 1. At this time, the refrigerant flowing to the inner passage 7 directly cools the armature winding 9 to recover most of heat in the same manner as in the conventional art. On the other hand, the refrigerant flowing to the outer passage 8 recovers only heat which cannot be recovered by the refrigerant flowing to the inner passage 7 at an equal heat recovery rate. Therefore, a rise in a temperature appearing on the surface of the motor is reduced remarkably.

In the first example, the structure described above is employed. Therefore, the refrigerants flowing to the inner passage 7 and the outer passage 8 are not mixed with each other over almost the whole length of the stator 1, and the refrigerant flowing in the inner passage 7 directly cools the armature winding 9 to recover the heat and the refrigerant flowing in the outer passage 8 recovers the heat which cannot be recovered in the inner passage again. Consequently, it is possible to considerably reduce the rise in the temperature of the surface of the linear motor by using an inactive refrigerant to simply improve the passage for the refrigerant. Moreover, the passage for the refrigerant which is formed in the can is caused to have the two-layer structure and the refrigerant is caused to branch in the inner part. Therefore, a cooling capability is more enhanced than that in the conventional art. In the invention, accordingly, it is possible to produce the same advantages of the rise in the temperature as those in the conventional art even if the flow of the refrigerant is limited (decreased) as compared with that in the conventional art. As a result, it is possible to relieve the deformation of the can.

SECOND EXAMPLE

Next, a second example of the invention will be described.

Figure 3:
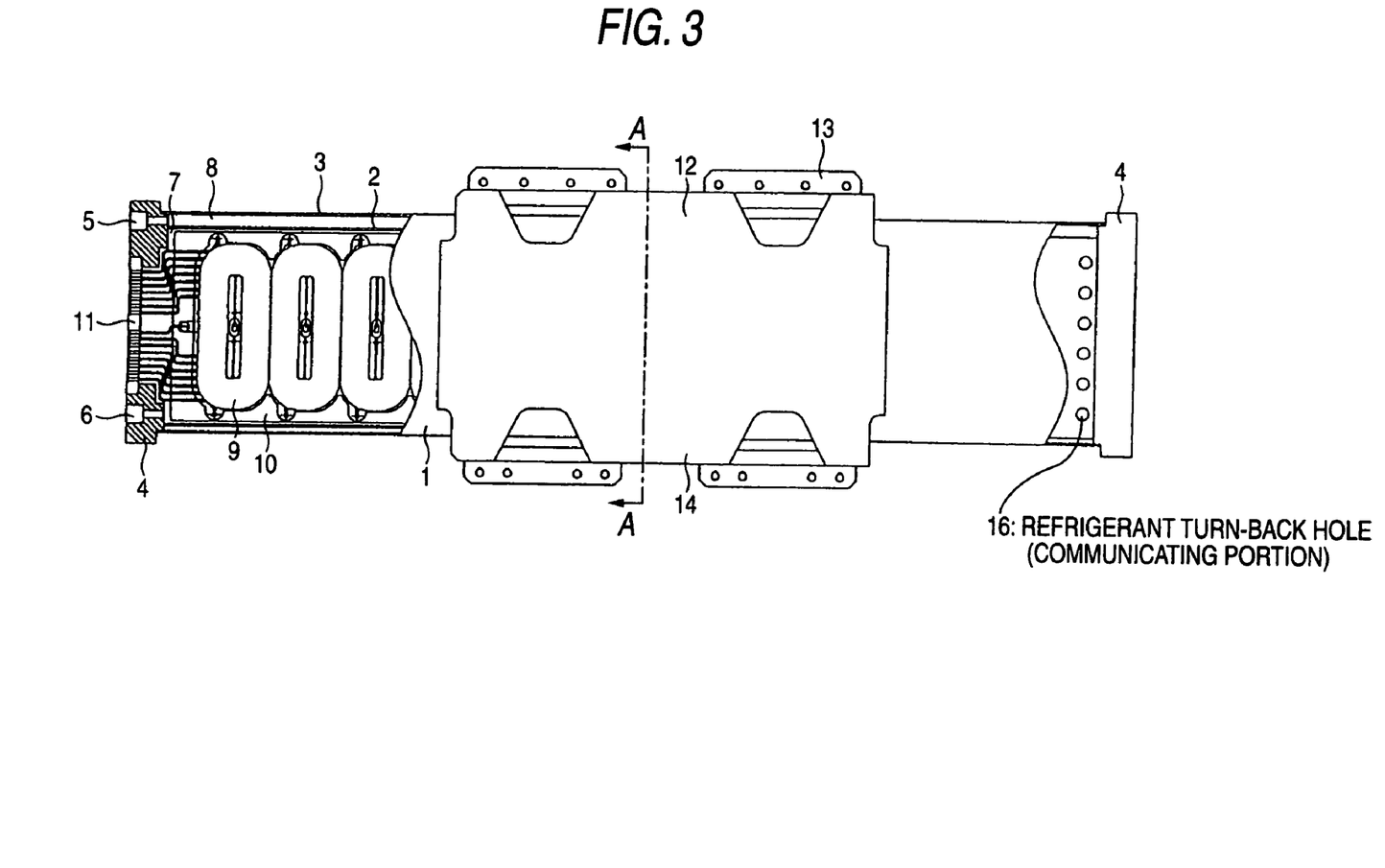
FIG. 3 is a partially sectional side view showing a linear motor in which an armature winding is provided on a stator according to a second example of the invention.

FIG. 3 is a partially sectional side view showing a linear motor in which an armature winding is provided on a stator according to the second example of the invention. A front sectional view showing the linear motor which is taken along an A-A line in FIG. 3 is the same as FIG. 2. Moreover, the same components of the second example as those of the first example have the same reference numerals and description thereof will be omitted, and only differences will be described.

The second example is the same as the first example in that a can is constituted by a two-layer structure including an inner can 2 and an outer can 3, and furthermore, there are provided an inner passage 7 formed between an armature winding 9 and the inner can 2 and an outer passage 8 formed between the inner can 2 and the outer can 3. On the other hand, the second example is different from the first example in that a header 4 having a refrigerant supply port 5 and a refrigerant injection port 6 is provided on one of the ends of the can and a communicating portion such as a refrigerant turn-back hole 16 which causes the outer passage 8 and the inner passage 7 to communicate with each other is provided at the other end on an opposite side to a side on which the refrigerant supply port 5 is disposed in the inner can 2 in such a manner that the refrigerant supplied from the refrigerant supply port 5 is turned back to flow toward the inner passage 7 through the outer passage 8.

Next, description will be given to the operation of the cooling mechanism of the linear motor.

The refrigerant supplied from the refrigerant supply port 5 passes through the outer passage 8 surrounded by the inner can 2 and the outer can 3 and flows over almost the whole length of a stator 1. The inner can 2 is provided with the refrigerant turn-back hole 16 at the other end on the opposite side to the side on which the refrigerant supply port 5 is disposed. Therefore, the refrigerant passes through the refrigerant turn-back hole 16 and then flows into the inner passage 7 formed by the inner can 2 and the armature winding 9. At this time, the refrigerant is not transferred between the inner passage 7 and the outer passage 8 excluding the refrigerant turn-back hole 16 and the refrigerant in the outer passage 8 which flows earlier protects the initial temperature of the surface of the motor, and subsequently, the refrigerant flowing to the inner passage 7 recovers heat while directly cooling the armature winding 9 and is injected from the refrigerant injection port 6.

Since the second example employs the structure described above, the refrigerant turned back at an opposite end to the refrigerant supply port 5 flows into the inner passage an injected from the refrigerant injection port 6 while recovering the heat. However, a fresh refrigerant is always supplied to the outer passage and the temperature is protected. In the same manner as in the first example, consequently, it is possible to considerably reduce a rise in the temperature of the surface of the linear motor by using an inactive refrigerant to simply improve the passage for the refrigerant. Moreover, the passage for the refrigerant which is formed in the can is caused to have the two-layer structure and the refrigerant is turned back in the inner part. Therefore, a cooling capability is more enhanced than that in the conventional art. In the invention, accordingly, it is possible to produce the same advantages of the rise in the temperature as those in the conventional art even if the flow of the refrigerant is limited (decreased) as compared with that in the conventional art. As a result, it is possible to relieve the deformation of the can.

THIRD EXAMPLE

Next, a third example of the invention will be described.

Figure 4:
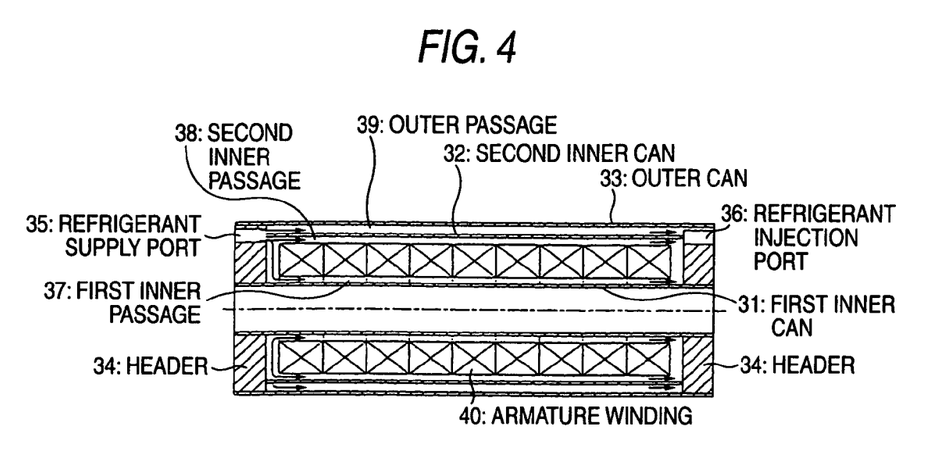
FIG. 4 is a sectional side view showing a linear motor armature according to a third example of the invention, illustrating an application example of a cylindrical linear motor.

FIG. 4 is a sectional side view showing a linear motor armature according to the third example of the invention, illustrating an application example of a cylindrical linear motor.

In FIG. 4, 31 denotes a first inner can, 32 denotes a second inner can, 33 denotes an outer can, 34 denotes a header, 35 denotes a refrigerant supply port, 36 denotes a refrigerant injection port, 37 denotes a first inner passage, 38 denotes a second inner passage, and 39 denotes an outer passage.

The features of the third example are as follows.

More specifically, in place of the outer can and the inner can which are formed like the rectangular cylinders according to the first and second examples, a can including the first inner can 31, the second inner can 32 and the outer can 33 which are formed cylindrically is constituted. Moreover, there is employed a structure in which a communication is carried out to cause a refrigerant supplied from the refrigerant supply port 35 to branch into a can including the first inner can 31, the second inner can 32 and the outer can 33 in the vicinity of the refrigerant supply port 35 in each of the cans 31, 32 and 33 as shown in FIG. 4. Since the operation of a cooling mechanism is basically identical to that of the first example, description will be omitted.

Since the structure described above is employed in the third example, the shape of the can is set to be cylindrical. Consequently, the distribution of a stress is equalized in a circumferential direction under the pressure of the flow of the refrigerant. Therefore, a pressure deformation resistance can be enhanced still more than that in each of the first and second examples. Since the pressure deformation resistance is enhanced, moreover, the structure can also be used well in a vacuum environment or an environment in which an external pressure is applied.

FOURTH EXAMPLE

Next, a fourth example of the invention will be described.

Figure 5:
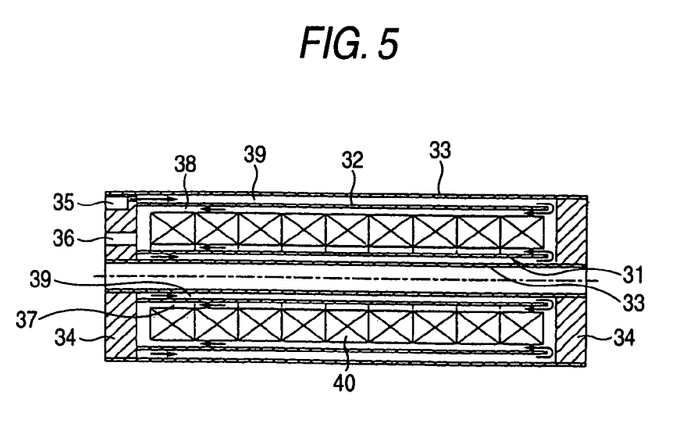
FIG. 5 is a sectional side view showing a linear motor armature according to a fourth example of the invention, illustrating an application example of the cylindrical linear motor.

FIG. 5 is a sectional side view showing a linear motor armature according to a fourth example of the invention, illustrating an application example of a cylindrical linear motor. Since components in the fourth example are basically the same as those in the third example, they have the same reference numerals and description thereof will be omitted.

The fourth example is the same as the third example in that a can including a first inner can 31, a second inner can 32 and an outer can 33 which are formed cylindrically is constituted, and is different from the third example in that there is employed a structure in which a refrigerant is turned back at an end on the opposite side of a supply port as shown in FIG. 5. Since the operation of a cooling mechanism is basically identical to that of the second example, description will be omitted.

Since the structure described above is employed in the fourth example, the shape of the can is set to be cylindrical. Consequently, the distribution of a stress is equalized in a circumferential direction under the pressure of the flow of the refrigerant. Therefore, a pressure deformation resistance can be enhanced still more in the same manner as in the third example. Since the pressure deformation resistance is enhanced, moreover, the structure can also be used well in a vacuum environment or an environment in which an external pressure is applied.

Figure 6:
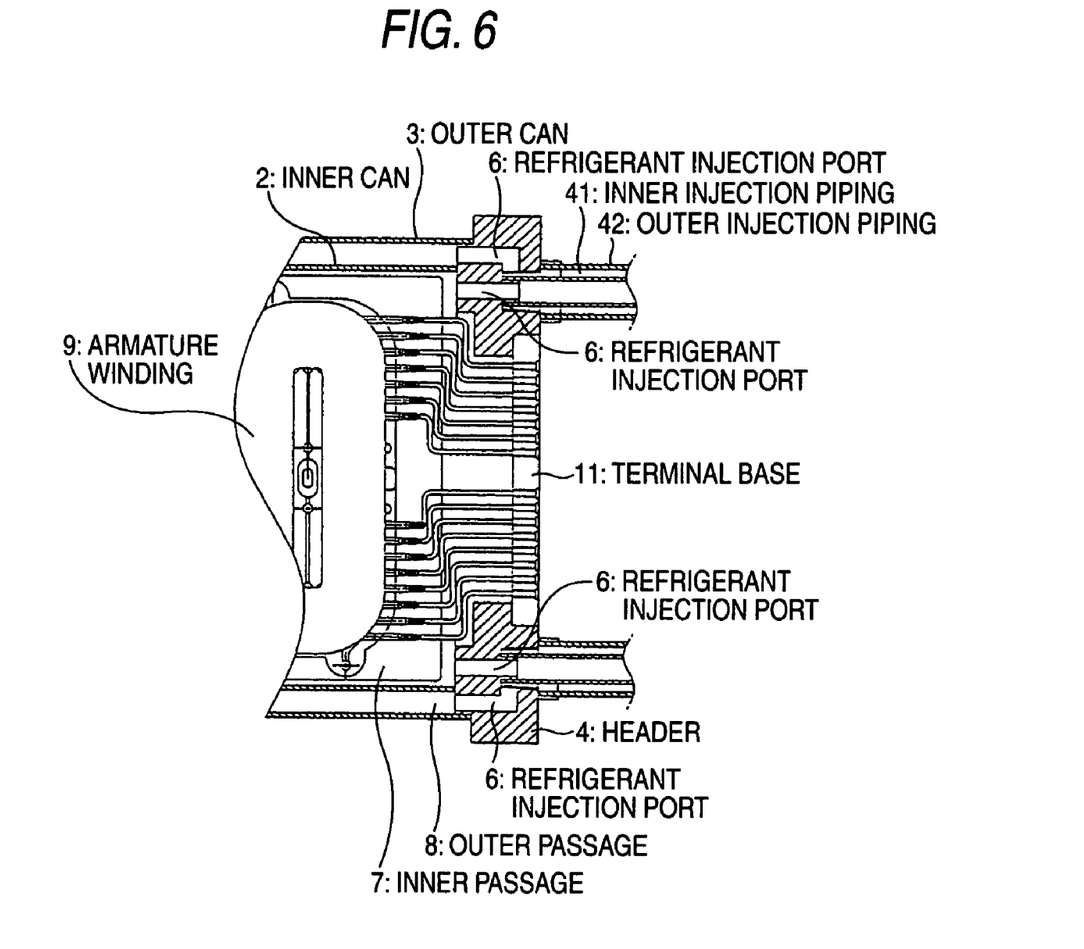
FIG. 6 is a sectional view showing a state in which a piping for discharging a refrigerant is attached according to another example of the invention.

While the description has been given to the structure in which the header having the refrigerant injection port 6 is provided on the other end of the can and the refrigerant is injected to an external piping which is not shown through the refrigerant injection ports 6 and 6 corresponding to the inner passage 7 and the outer passage 8 in the first example, it is also possible to employ the structure of a piping in which the refrigerant is injected, in a two-layer state, to the ends of the refrigerant injection port 6 for the inner passage 7 and the refrigerant injection port 6 for the outer passage 8. FIG. 6 is a sectional view showing the state of attachment of a piping for discharging a refrigerant according to another example of the invention. More specifically, in FIG. 6, a refrigerant injection port 6 of a header 4 is provided with an inner injection piping 41 provided to be connected to the refrigerant injection port 6 for an inner passage 7 and an outer injection piping 42 provided to cover the outside of the inner injection piping 41 and disposed to be connected to the refrigerant injection port 6 for the outer passage 8, and a refrigerant flowing in the outer passage 8 and having a comparatively small rise in a temperature flows to a space formed by the inner injection piping 41 and the outer injection piping 42 which serves to injection the refrigerant in a two-layer state, and the refrigerant flowing in the inner passage 7 from which heat is recovered is covered and is simultaneously injected to a refrigerant circulating apparatus which is not shown. Consequently, the refrigerant which is heat exchanged in the can also considerably reduce a rise in the temperature of a injection piping portion other than a motor body. Such means can also be applied to the third example.

While the refrigerant turn-back hole 16 has been taken as an example of the communicating portion in the second example, moreover, it is characterized in that the hole is not restricted but the refrigerant is turned back from the outside to the inside at the opposite end on the refrigerant supply side.

Moreover, it is apparent that a proper selection can be made in order to provide the armature winding and the field portion on either the stator or the moving member in the linear motor. Moreover, a conducting method is not restricted to DC conduction and AC conduction methods.

INDUSTRIAL APPLICABILITY

As described above, the linear motor armature and the linear motor according to the invention are useful for a projection exposing apparatus, a shape measuring apparatus or a high precision processing machine for manufacturing a semiconductor or the like, for example.

The invention claimed is:

1. A linear motor armature comprising an armature winding and a can provided to cover the armature winding and serving to cause a refrigerant to flow around the armature winding to carry out cooling,
    wherein the can is constituted by a two-layer structure having an inner can and an outer can and includes an inner passage formed between the armature winding and the inner can and an outer passage formed between the inner can and the outer can,
    both ends of the can have a header provided in such a manner that one of the ends serves as a refrigerant supply port and the other end serves as a refrigerant injection port, and
    a communicating portion for causing the inner passage and the outer passage to communicate with each other is provided in the vicinity of the refrigerant supply port of the can in such a manner that the refrigerant supplied from the refrigerant supply port branches into the inner passage and the outer passage and thus flows, wherein
    the refrigerant injection port of the header includes an inner injection piping provided to be connected to the refrigerant injection port for the inner passage and an outer injection piping provided to cover an outside of the inner injection piping and disposed to be connected to the refrigerant injection port for the outer passage, and the refrigerant is injected in a two-layer state
    and wherein the motor is a linear motor.

2. The linear motor armature according to claim 1 wherein the outer can and the inner can are formed to be rectangularly cylindrical.

3. The linear motor armature according to claim 1 wherein the outer can and the inner can are formed to be cylindrical.

4. A linear motor comprising the linear motor armature according to claim 1 and a field portion opposed to the armature through a void, the field portion being constituted by a yoke and a plurality of permanent magnets which are provided on the yoke adjacently to each other in such a manner that polarities are alternately different from each other, and one of the armature and the field portion being set to be a moving member which relatively moves and the other being set to be a stator
    wherein the motor is a linear motor.

5. A linear motor armature comprising:
    an armature winding;
    a can provided operable to cover the armature winding and farther operable to cause a refrigerant to flow around the armature winding;
    the can farther comprising a two-layer structure having an inner can and an outer can;
    an inner passage defined by a space between the armature winding and the inner can;
    an outer passage defined by a space between the inner can and the outer can;
    a refrigerant supply port being provided at a first end of the can;
    a refrigerant injection port provided at a second end opposite to the first end, and
    a communicating portion between the inner passage and the outer passage provided in the vicinity of the refrigerant supply port of the can,
    wherein the refrigerant branches into the inner passage and the outer passage and
    the linear motor further comprises:
    an inner injection piping connected to the refrigerant injection port for the inner passage and an outer injection piping connected to the refrigerant injection port for the outer passage, wherein the refrigerant is operable to be injected in a two-layer state wherein the motor is a linear motor.

6. The linear motor armature according to claim 5 wherein the outer can and the inner can define a rectangular annular space therebetween.

7. The linear motor armature according to claim 5 wherein the outer can and the inner can define a cylindrical annular space therebetween.

8. The linear motor according to claim 5, further comprising a field portion opposed to the armature through a void, the field portion further comprising:

a yoke and a plurality of permanent magnets which are provided on the yoke adjacently to each other in such a manner that polarities are alternately different from each other, wherein one of the armature and the field portion being set to be a moving member and the other being set to be a stator.

* * * * *